United States Patent
Rao et al.

(10) Patent No.: US 11,449,257 B2
(45) Date of Patent: Sep. 20, 2022

(54) HOST DEVICE WITH EFFICIENT AUTOMATED SEAMLESS MIGRATION OF LOGICAL STORAGE DEVICES ACROSS MULTIPLE ACCESS PROTOCOLS

(71) Applicant: EMC IP Holding Company LLC, Hopkinton, MA (US)

(72) Inventors: Vinay G. Rao, Bangalore (IN); Sanjib Mallick, Bangalore (IN); Natasha Gaurav, Hopkinton, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 16/797,671

(22) Filed: Feb. 21, 2020

(65) Prior Publication Data

US 2021/0263665 A1    Aug. 26, 2021

(51) Int. Cl.
*G06F 13/42*    (2006.01)
*G06F 3/06*    (2006.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
CPC .... G06F 3/0607; G06F 3/0656; G06F 3/0659; G06F 3/0661; G06F 3/0665;
(Continued)

(56) References Cited

U.S. PATENT DOCUMENTS 6,567,397 B1    5/2003  Campana et al.
6,654,830 B1 *  11/2003 Taylor .................. G06F 3/0601
                                                        709/203
(Continued)

FOREIGN PATENT DOCUMENTS

CN    103677927 B    2/2017
EP      1117028 A2    7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Ilwoo Park
(74) *Attorney, Agent, or Firm* — Ryan, Mason & Lewis, LLP

(57) ABSTRACT

An apparatus comprises a host device configured to communicate over a network with a storage system. The host device establishes a migration session in the host device for migration of a source logical storage device accessible utilizing a first access protocol to a target logical storage device accessible utilizing a second access protocol, and migrates the source logical storage device to the target logical storage device utilizing a multi-path layer of the host device. The multi-path layer maintains separate device identities for the respective source and target logical storage devices in conjunction with the migration session but presents a corresponding composite device having a single device identity to one or more applications executing on the host device. The multi-path layer translates one or more commands directed to the composite device in the first access protocol to one or more commands in the second access protocol.

20 Claims, 3 Drawing Sheets

(51) Int. Cl.
  *G06F 13/40* (2006.01)
  *G06F 13/16* (2006.01)
(52) U.S. Cl.
  CPC ........ *G06F 3/0659* (2013.01); *G06F 13/1668* (2013.01); *G06F 13/4027* (2013.01); *G06F 13/4221* (2013.01); *G06F 13/4234* (2013.01); *G06F 2213/0036* (2013.01)
(58) Field of Classification Search
  CPC ............... G06F 3/0689; G06F 13/1668; G06F 13/4021; G06F 13/4027; G06F 13/4234; G06G 2213/0024; G06G 2213/0036; G06G 2213/3852
  USPC ........... 710/74; 711/154, 161, 162; 707/618, 707/619, 626, 616, 622, 623, 633–639, 707/654–660; 714/6.11–6.13, 6.23, 6.3, 714/6.32
  See application file for complete search history.

(56) References Cited

U.S. PATENT DOCUMENTS

| | | | |
|---|---|---|---|
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1* | 3/2011 | Bappe ................... G06F 3/0647 711/162 |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,400,611 | B1 | 7/2016 | Raizen |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2004/0158652 | A1* | 8/2004 | Obara ................... G06F 3/0601 710/5 |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1 | 8/2008 | Salil |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0246648 | A1* | 8/2018 | Venkat ................ G06F 11/1662 |
| 2018/0253256 | A1 | 9/2018 | Bharadwaj |
| 2018/0317101 | A1 | 11/2018 | Koue |
| 2019/0034427 | A1* | 1/2019 | Trika ...................... G06F 16/21 |
| 2019/0095299 | A1 | 3/2019 | Liu et al. |
| 2019/0108888 | A1 | 4/2019 | Sarkar et al. |
| 2020/0225863 | A1* | 7/2020 | Veluswamy ............ G06F 3/061 |
| 2020/0233584 | A1* | 7/2020 | Yang ..................... G06F 3/0607 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
U.S. Appl. No. 15/795,653 filed in the name of Maneesh Pusalkar et al., filed Oct. 27, 2017, and entitled "Storage System with Network-Wide Configurable Device Names."
U.S. Appl. No. 16/142,274 filed in the name of Sanjib Mallick et al., filed Sep. 26, 2018, and entitled "Host Device with Multi-Path Layer Implementing Automatic Standby Setting for Active-Active Configuration."
U.S. Appl. No. 16/145,502 filed in the name of Vinay G. Rao et al., filed Sep. 28, 2018, and entitled "Host Device with Multi-Path Layer Implementing Path Selection Based at Least in Part on Fabric Identifiers."
U.S. Appl. No. 16/155,491 filed in the name of Kundan Kumar et al., filed Oct. 9, 2018, and entitled "Migrating Control of a Multi-Path Logical Device from a Current MPIO Driver to a Target MPIO Driver."
U.S. Appl. No. 16/155,429 filed in the name of Rimpesh Patel et al., filed Oct. 9, 2018, and entitled "Categorizing Host IO Load Pattern and Communicating Categorization to Storage System."
U.S. Appl. No. 16/697,393 filed in the name of Vinay G. Rao et al., filed Nov. 27, 2019, and entitled "Automated Seamless Migration of Logical Storage Devices."
U.S. Appl. No. 16/710,828 filed in the name of Amit PundalikAnchi et al., filed Dec. 11, 2019, and entitled "Automated Seamless Migration with Signature Issue Resolution."
U.S. Appl. No. 16/793,262 filed in the name of Amit PundalikAnchi et al., filed Feb. 18, 2020, and entitled "Non-Disruptive Transformation of a Logical Storage Device from a First Access Protocol to a Second Access Protocol."

* cited by examiner

HOST DEVICE WITH EFFICIENT AUTOMATED SEAMLESS MIGRATION OF LOGICAL STORAGE DEVICES ACROSS MULTIPLE ACCESS PROTOCOLS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. However, host-based seamless migration in these and other contexts can be inefficient, consuming significant amounts of computational and network resources of the host device. Such requirements of conventional approaches can negatively impact the seamless migration process and thereby degrade overall system performance. Accordingly, a need exists for improved migration techniques that can avoid such drawbacks of conventional approaches.

SUMMARY

Illustrative embodiments provide techniques for efficient automated seamless migration of logical storage volumes or other types of logical storage devices across multiple access protocols. For example, some embodiments are configured to facilitate migration of a source logical storage device using a first access protocol such as SCSI-FC to a target logical storage device using a second access protocol such as NVMeoFC, where FC denotes Fibre Channel, in a particularly efficient manner that intelligently leverages storage system resources rather than over-burdening host device resources. Automated seamless migration functionality across a wide variety of other access protocols can be supported in other embodiments.

Illustrative embodiments utilize a multi-path layer of the host device in performing the migration of the source logical storage device to the target logical storage device. The multi-path layer in such embodiments maintains separate device identities for the source and target logical storage devices, while presenting a corresponding "pseudo device" or other type of composite device having a single device identity to one or more upper layers of the host device. This allows the multi-path layer to translate commands directed to the composite device in the first access protocol to commands in the second access protocol, suitable for delivery to the target logical storage device, in a manner that masks or otherwise hides the access protocol differences between the source and target logical storage devices in conjunction with the migration session.

Advantageously, illustrative embodiments can substantially reduce the amounts of host device computational and network resources that are consumed in performing automated seamless migration across multiple access protocols, relative to conventional host-based seamless migration approaches.

In one embodiment, an apparatus comprises a host device that includes a processor coupled to a memory. The host device is configured to communicate over a network with a storage system. The host device establishes a migration session in the host device for migration of a source logical storage device accessible utilizing a first access protocol to a target logical storage device accessible utilizing a second access protocol, and migrates the source logical storage device to the target logical storage device utilizing a multi-path layer of the host device. The multi-path layer illustratively maintains separate device identities for the respective source and target logical storage devices in conjunction with the migration session but presents a corresponding composite device having a single device identity to one or more applications executing on the host device. The multi-path layer also translates one or more commands directed to the composite device in the first access protocol to one or more commands in the second access protocol. The composite device having the single device identity in some embodiments comprises a pseudo device of the multi-path layer.

The multi-path layer in some embodiments comprises one or more multi-path input-output (MPIO) drivers each configured to control delivery of IO operations from the host device to the storage system over selected paths through the network. Different MPIO drivers of the multi-path layer may be provided by different host devices that share the storage system.

In some embodiments, the host device in conjunction with migrating the source logical storage device to the target logical storage device directs the storage system to establish a copy relationship between the source logical storage device and the target logical storage device, and obtains an indication from the storage system that the copy relationship has been established. Responsive to the obtained indication, the host device activates the previously-established migration session with background copying disabled, starts sending IO operations to the target logical storage device instead of to the source logical storage device, and enables background copying for the activated migration session such that data of the source logical storage device is copied to the target logical storage device by the storage system.

In some embodiments, the source logical storage device and the target logical storage device are both located on the same storage system. Alternatively, the source logical storage device and the target logical storage device can be located on respective first and second storage systems, possibly arranged in an active-active configuration. The host device in such an embodiment is configured to communicate over the network with the first and second storage systems.

In some embodiments, directing the storage system to establish a copy relationship between the source logical storage device and the target logical storage device comprises directing the storage system to establish a copy relationship between the source logical storage device and the target logical storage device that when activated causes copying of data from the source logical storage device to the target logical storage device. The copy relationship in such an embodiment is illustratively established but is not activated to perform the copying of data from the source logical storage device to the target logical storage device.

In some embodiments, obtaining an indication from the storage system that the copy relationship has been established comprises sending a command to the storage system, and obtaining the indication responsive to the command. Other techniques can be used to obtain the indication in other embodiments.

Establishing the migration session in the host device for migration of the source logical storage device to the target logical storage device in some embodiments comprises configuring but not activating the migration session in the host device.

In some embodiments, activating the previously-established migration session with background copying disabled is configured to ensure that any IO operation sent to the target logical storage device instead of to the source logical storage device will cause corresponding data to be copied from the source logical storage device to the target logical storage device.

The host device is illustratively further configured to terminate the activated migration session responsive to completion of the copying of the data of the source logical storage device to the target logical storage device by the storage system. The source logical storage device may be, for example, deprecated or repurposed responsive to termination of the activated migration session.

Some embodiments include one or more additional host devices each configured to communicate over the network with the storage system, with each of the host devices separately moving from utilization of the source logical storage device to utilization of the target logical storage device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
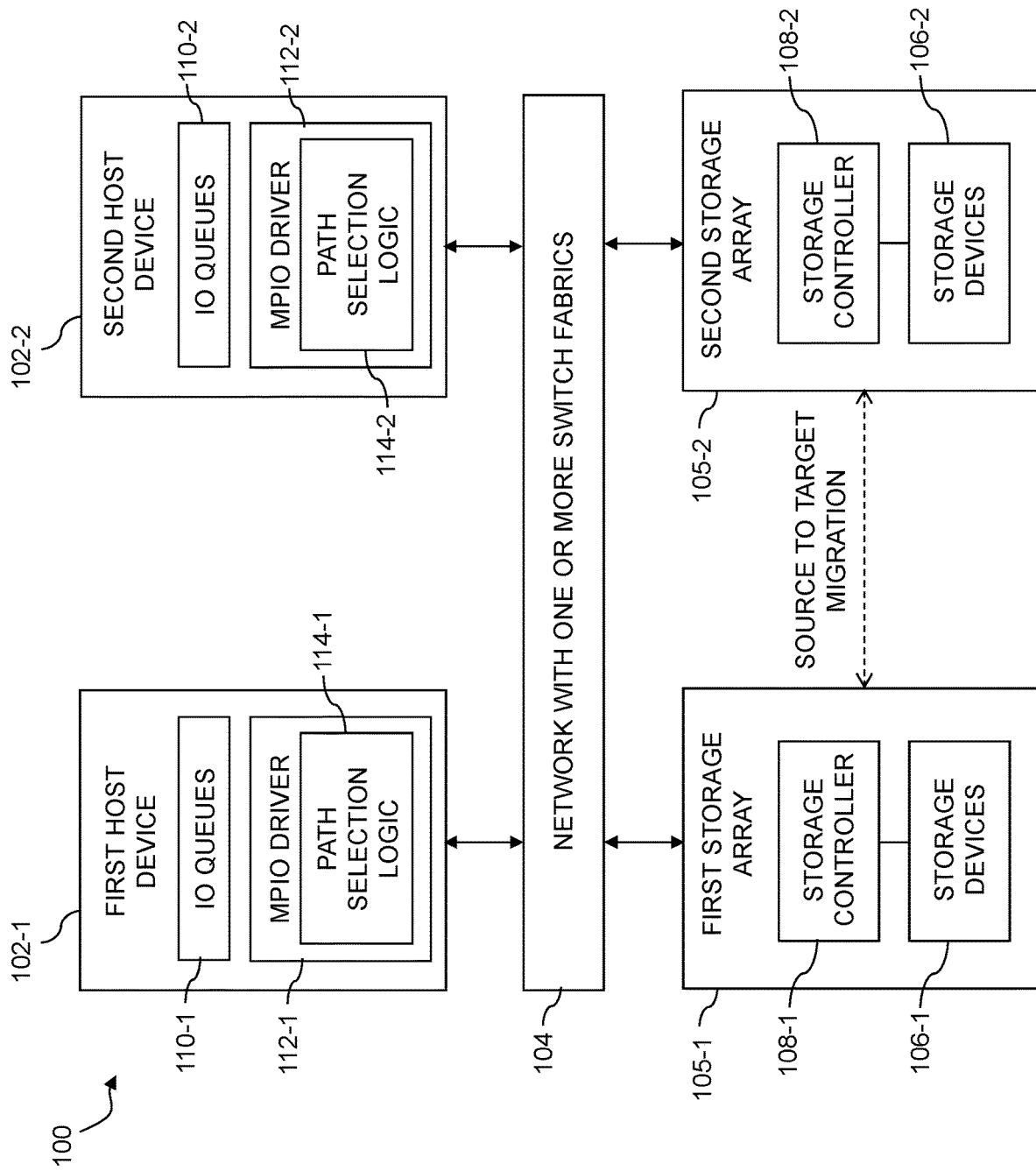
FIG. 1 is a block diagram of an information processing system configured with functionality for automated seamless migration across access protocols utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Massachusetts.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for migration between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "automated seamless migration" of logical storage devices of the storage arrays 105. Such automated seamless migration functionality may be implemented at least in part in the multi-path layer, and may additionally or alternatively be implemented in migration control logic of the host devices 102 and storage arrays 105.

The MPIO drivers 112 may comprise, for example, otherwise conventional MPIO drivers, such as PowerPath® drivers from Dell EMC, suitably modified in the manner disclosed herein to support automated seamless migration across access protocols. Other types of MPIO drivers from other driver vendors may be suitably modified to incorporate functionality for automated seamless migration as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of automated seamless migration functionality of host device 102-1. Other host device components, such as migration control logic implemented in one or more host device processors, can additionally or alternatively implement aspects of the automated seamless migration functionality of the host device 102-1. The disclosed embodiments are therefore not limited to embodiments in which automated seamless migration functionality is controlled at least in part by an MPIO driver or multi-path layer.

As indicated previously, migration of logical storage volumes or other logical storage devices from one storage system to another storage system using conventional approaches can be problematic, particularly when source and target logical storage devices use different access protocols, such as respective SCSI and NVMe access protocols. For example, host-based seamless migration in these and other contexts can be inefficient, consuming significant amounts of computational and network resources of the host device. Such requirements of conventional approaches can negatively impact the seamless migration process and thereby degrade overall system performance.

Illustrative embodiments provide techniques for efficient automated seamless migration of logical storage volumes or other types of logical storage devices across multiple access protocols. For example, some embodiments are configured to facilitate migration of a source logical storage device using a first access protocol such as SCSI-FC to a target logical storage device using a second access protocol such as NVMeoFC, in a particularly efficient manner that intelligently leverages storage system resources rather than overburdening host device resources. Automated seamless migration functionality across a wide variety of other access protocols are supported in other embodiments.

Migration of logical storage volumes or other logical storage devices from one storage system to another storage system using conventional approaches typically requires either close cooperation between a host administrator and a storage administrator, or "spoofing" of source logical storage device identifiers by corresponding target logical storage devices.

For example, some conventional host-based migration processes such as PowerPath® Migration Enabler (PPME) typically require that a host administrator and a storage administrator cooperate in setting up and executing the migration process, which in some circumstances can complicate the migration effort.

Storage-based migration processes such as Non-Destructive Migration (NDM) do not require such cooperation, but typically require device spoofing. More particularly, these storage-based migration processes typically require the target device to spoof the source device identifier or ID. This spoofing poses problems since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as an MPIO driver of a multi-path layer can merge the two device IDs into a single device ID for presentation to a host device processor layer, thereby avoiding the problems associated with spoofing.

The automated seamless migration techniques of illustrative embodiments disclosed herein provide significant advantages over these and other conventional approaches, while also avoiding the need for spoofing of logical storage device identifiers.

In accordance with the automated seamless migration functionality, the host device 102-1 is configured to establish a migration session in the host device 102-1 for migration of a source logical storage device accessible utilizing a first access protocol to a target logical storage device accessible utilizing a second access protocol different than the first access protocol, and to migrate the source logical storage device to the target logical storage device utilizing the MPIO driver 112-1 of the host device 102-1. The MPIO driver 112-1 maintains separate device identities for the respective source and target logical storage devices in conjunction with the migration session but presents a corresponding composite device having a single device identity to one or more applications executing on the host device. The composite device illustratively comprises a pseudo device configured and maintained by the MPIO driver 112-1, and its single device identity may be, for example, the same identity as the source logical storage device, although a different device identity may be used. The MPIO driver 112-1 also translates one or more commands directed to the composite device in the first access protocol to one or more commands in the second access protocol, suitable for delivery to the target logical storage device. Such translation illustratively involves use of one or more translation tables stored in a memory of the host device 102-1.

The MPIO driver 112-1 therefore maintains separate device identities for the source and target logical storage devices, while presenting a corresponding pseudo device or other type of composite device having a single device identity to one or more upper layers of the host device. This allows the MPIO driver 112-1 to translate commands directed to the composite device in the first access protocol to commands in the second access protocol, suitable for delivery to the target logical storage device, in a manner that masks or otherwise hides the access protocol differences between the source and target logical storage devices in conjunction with the migration session.

In some embodiments, the first access protocol associated with the source logical storage device comprises a SCSI access protocol and the second access protocol associated with the target logical storage device comprises an NVMe access protocol. The SCSI and NVMe protocols utilized in such illustrative embodiments are examples of what are more generally referred to herein as "first and second access protocols." The SCSI and NVMe protocols of the respective source and target logical storage devices may more particularly comprise SCSI-FC and NVMeoFC access protocols, respectively, although numerous other types of first and second access protocols can be used in other embodiments.

The MPIO driver 112-1 in translating one or more commands directed to the composite device in the first access protocol to one or more commands in the second access protocol is illustratively configured to modify at least a subset of the commands in the first access protocol in order to produce corresponding commands in the second access protocol, in a manner that resolves any differences between the protocols. For example, the NVMeoFC protocol implements SCSI-3 persistent reservations in a different manner than SCSI-FC, such that there are differences in the corresponding commands between the two protocols. Other commands such as check condition ("chk_cond") commands also have differences between the two protocols. These and other differences are illustratively reflected in a SCSI-to-NVMe translation table or other type of translation table utilized by the MPIO driver 112-1 to translate the commands from SCSI-FC to NVMeoFC.

Such embodiments advantageously facilitate the transition of NVMeoFC adoption within system 100 by providing automated seamless migration from SCSI-FC to NVMeoFC for logical storage devices of the system 100. For example, some existing HBAs support both multiple access protocols, such as SCSI-FC and NVMeoFC modes, so in systems with such HBAs there is no need to change hardware in order to migrate between the two different access protocols. However, as indicated previously, conventional migration techniques in these and other contexts can consume excessive amounts of host resources, and are therefore inefficient and undermine system performance.

It is assumed in the present embodiment that the source and target logical storage devices are located on respective ones of the first and second storage arrays 105. However, in other embodiments, it is possible that the source and target logical storage devices are both located on the same storage array.

The above-noted "establishment" of a migration session in the host device 102-1 as that term and related terms are broadly used herein encompasses various arrangements in which a migration session is at least partially configured but is not activated, for example, to carry out actual copying of data from the source logical storage device to the target logical storage device. The host device 102-1 in establishing the migration session in the host device 102-1 for migration of the source logical storage device to the target logical storage device therefore illustratively pre-configures or otherwise at least partially configures, but does not activate, the migration session in the host device 102-1.

In some embodiments, the host device 102-1 in conjunction with migrating the source logical storage device to the target logical storage device is further configured to direct at least one of the first and second storage arrays 105 to establish a copy relationship between the source logical storage device and the target logical storage device, to obtain an indication from at least one of the first and second storage arrays 105 that the copy relationship has been established, and responsive to the obtained indication, to activate the previously-established migration session with background copying disabled. The host device 102-1 is further configured to start sending IO operations to the target logical storage device instead of to the source logical storage device, and to enable background copying for the activated migration session such that data of the source logical storage device is copied to the target logical storage device by interaction of the first and second storage arrays 105. Such operations may be performed the MPIO driver 112-1 or other components of the host device 102-1.

The copy relationship established between the source logical storage device and the target logical storage device comprises a copy relationship that is not initially activated at the time of establishment of the copy relationship, but when later activated causes copying of data from the source logical storage device of the first storage array 105-1 to the target logical storage device of the target storage array 105-2. Such data copying is illustratively storage-side data copying that is performed primarily by the first and second storage arrays 105 without consuming excessive resources of the host device 102-1.

The above-noted obtaining of an indication from at least one of the first and second storage arrays 105 that the copy relationship has been established illustratively comprises sending a command to at least one of the first and second storage arrays 105, and obtaining the indication responsive to the command.

The command can include, for example, a mode sense command, an inquiry command or other types of SCSI or VU commands. For example, one possible alternative to use of a mode sense command in this context and other contexts herein involves use of a VU inquiry ("Inq") command.

As a more particular example, the host device 102-1 can receive a notification comprising a check condition ("chk_cond") notification and the command can comprise an inquiry command generated in response to the check condition notification. Numerous other arrangements using different types of commands are possible.

As indicated above, establishing the migration session in the host device 102-1 for migration of the source logical storage device to the target logical storage device in some embodiments comprises configuring but not activating the migration session in the host device 102-1. Once activated, the migration session can be utilized to carry out actual copying of data from the source logical storage device to the target logical storage device. The copying of data is also referred to herein as being performed as part of a migration process. Such a migration process can encompass, for example, the activated migration session in the host device 102-1, and possibly also a corresponding migration session activated in the first and second storage arrays 105, with the storage-side process illustratively configured for storage array based copying of data from the source logical storage device to the target logical storage device in a manner that avoids excessive consumption of host device resources.

A subsequent activation of the previously-established migration session with background copying disabled is advantageously configured to ensure that any IO operation sent to the target logical storage device instead of to the source logical storage device will cause corresponding data to be copied from the source logical storage device of the first storage array 105-1 to the target logical storage device of the second storage array 105-2.

The host device 102-1 is further configured to terminate the activated migration session responsive to completion of the copying of the data of the source logical storage device to the target logical storage device. The source logical storage device is deprecated or repurposed responsive to termination of the activated migration session.

As indicated above, activation of the previously-established migration session in the host device 102-1 based at least in part on the obtained indication illustratively causes a migration process to be performed in which data is copied from the source logical storage device to the target logical storage device.

The migration process can include, for example, a storage-based migration process in which the first storage array 105-1 controls the copying of the data from the first storage array 105-1 to the second storage array 105-2, illustratively with no significant involvement of the host device 102-1 in the migration process.

As another example, the migration process can include a host-based migration process in which the first storage array 105-1 controls the copying of the data from the first storage array 105-1 to the second storage array 105-2, but with significant involvement of the host device 102-1 in the migration process. For example, the MPIO driver 112-1 of the host device 102-1 can initiate the data copying.

Other types of migration processes involving at least one of the host device 102-1 and the storage arrays 105 can be used in other embodiments.

The host device 102-1 is further configured to obtain, in conjunction with the migration process, an indication from the second storage array 105-2 that the first and second storage arrays 105 have achieved synchronization with respect to the migration of the source logical storage device to the target logical storage device, and to commit to utilization of the target logical storage device responsive to the indication. Once committed to utilizing the target logical storage device, the host device 102-1 no longer utilizes the source logical storage device.

Multiple host devices 102 can be similarly notified that they should commit to the utilization of the target logical storage device, once the first and second storage arrays 105 have achieved synchronization with respect to the migration of the source logical storage device to the target logical storage device.

For example, each of the host devices 102 is illustratively configured to obtain a notification from at least one of the first and second storage arrays 105 directing that the host device move from utilization of the source logical storage device to utilization of the target logical storage device.

After all of the host devices 102 using the source logical storage device have committed in the manner described above to utilization of the target logical storage device, the migration from source to target is considered fully complete, and the source logical storage device can therefore be removed or otherwise deleted from the system 100.

Accordingly, in some embodiments, at least one of the first and second storage arrays 105 will notify all of the host devices 102 that are working with the source logical storage device to instead start working with the target logical storage device. This is illustratively achieved by a given one of the storage arrays 105 issuing a check condition notification or other type of notification at a particular point in time to each of the host devices 102, even if that host device is turned off or in a "sleep" state. Any such host device will address the notification when it is later turned on or "wakes up," such that it will automatically start working with the target logical storage device instead of the source logical storage device.

Such features are examples of what is more generally referred to herein as "automated seamless migration" of logical storage devices. Illustrative embodiments are "automated" in that no coordination between a host administrator and a storage administrator is required, and are also "seamless" in that each host device seamlessly transitions from usage of the source logical storage device to usage of the target logical storage device at an appropriate time, without the need for any synchronization between multiple host devices. Other advantages are provided by other automated seamless migration arrangements in other embodiments.

In some embodiments, the source logical storage device comprises a non-paired or "local only" logical device and the target logical storage device comprises a paired logical device. Such a paired logical device is illustratively established in accordance with an active-active configuration of the first and second storage arrays 105, and is identified by the MPIO driver 112-1 as a single logical device but has separate corresponding logical devices on the respective first and second storage arrays. Migration from a non-paired logical device to a paired logical device can be implemented, for example, in order to achieve a high availability arrangement for the data of the migrated logical device, with the migrated logical device being accessible on both of the storage arrays 105. These and numerous alternative data movement scenarios or more generally other types of migration scenarios can be similarly configured to utilize automated seamless migration techniques as disclosed herein.

The above-described functions associated with automated seamless migration functionality of the host device 102-1 are illustratively carried out at least in part utilizing the MPIO driver 112-1 and its path selection logic 114-1. For example, in some embodiments, the seamless migration functionality can be implemented substantially entirely under the control of the MPIO driver 112-1, and in such embodiments the path selection logic 114-1 is illustratively configured to control performance of the steps of the flow diagram to be described below in conjunction with FIG. 2. Additional or alternative host device components, such as migration control logic implemented in the host device, can be used to control performance of an automated seamless migration process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed automated seamless migration functionality. Accordingly, aspects of automated seamless migration functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support automated seamless migration.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the automated seamless migration functionality.

The operation of the information processing system 100 will now be described in further detail with reference to the flow diagram of the illustrative embodiment of FIG. 2. The process as shown includes steps 200 through 214, and is suitable for use in the system 100 but is more generally applicable to other types of systems comprising one or more host devices and first and second storage systems. The first and second storage systems in this embodiment are assumed to comprise respective first and second storage arrays, possibly but not necessarily arranged in an active-active configuration, with each storage array comprising a plurality of storage devices. The storage devices of the first and second storage arrays are assumed to include logical storage devices such as LUNs or other logical storage volumes. The source and target logical storage devices of the automated seamless migration process shown in the figure are referred to as simply source and target devices in the following description.

Figure 2:
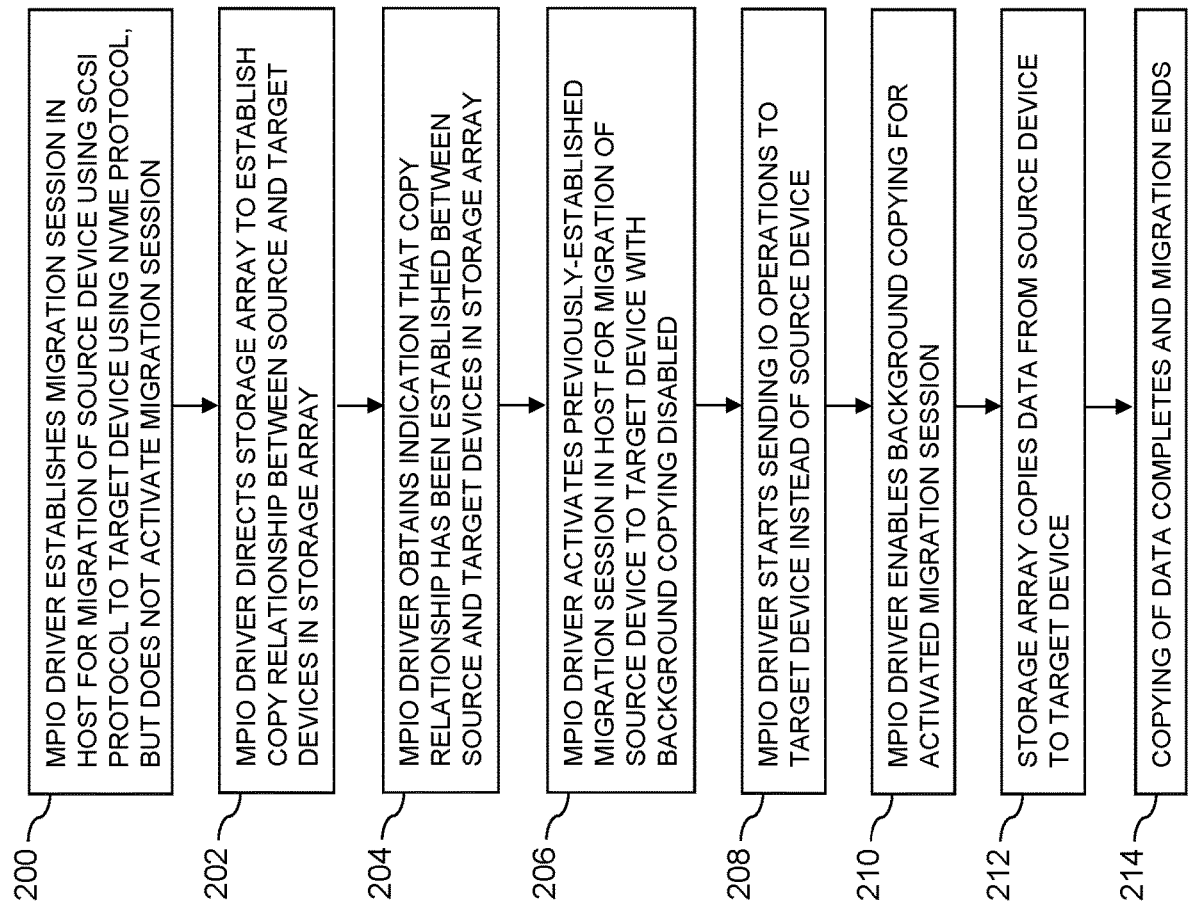
FIG. 2 is a flow diagram of a process for automated seamless migration across access protocols utilizing a multi-path layer of a host device in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process is illustratively performed at least in part in conjunction with a load balancing algorithm or other type of path selection algorithm executed by the path selection logic 114-1 of the MPIO driver 112-1.

In step 200, the MPIO driver in the host device establishes a migration session in the host device for migration of a source device using a SCSI protocol to a target device using an NVMe protocol, but does not activate the migration session.

These and other similar references herein to "establishing" of a migration session are intended to be broadly construed so as to encompass, for example, configuring of the migration session, including performance of one or more associated operations up to but not including activation of the migration session. An "established migration session" in this embodiment illustratively refers to a migration session that has been configured at least in part by the MPIO driver, possibly in collaboration with other host device components, in that one or more parameters or other features of the migration session have been established, but the migration session has not yet been activated for copying of data from the source device to the target device. A given such established migration session can therefore be subsequently activated, as is done in the present embodiment in step 206 below.

The source and target devices illustratively comprise respective logical storage devices on respective ones of the first and second storage arrays, although other arrangements are possible. For example, it is possible that the source and target logical storage devices may both be located on the same storage array.

The SCSI and NVMe protocols utilized in the present embodiment are examples of what are more generally referred to herein as "first and second access protocols." The SCSI and NVMe protocols may more particularly comprise SCSI-FC and NVMeoFC access protocols, respectively, although numerous other types of first and second access protocols can be used in other embodiments.

In step 202, the MPIO driver directs the first storage array to establish a copy relationship between the source and target devices. For example, the MPIO driver can direct the first storage array to establish a copy relationship between the source device and the target device that when activated causes copying of data from the source device to the target device. In such an arrangement, the copy relationship is illustratively established but is not activated to perform the copying of data from the source device to the target device. Such activation of the copy relationship is illustratively performed later, and more particularly in step 210 in the present embodiment. Other types of relationships can be established between source and target devices in other embodiments, such as a clone relationship.

In step 204, the MPIO driver obtains an indication that the copy relationship has been established between the source and target devices. For example, the MPIO driver can obtain an indication from at least one of the first and second storage arrays that the copy relationship has been established, possibly by sending a command to the first storage array, and obtaining indication responsive to the command. As another example, the MPIO driver can detect a notification from at least one of the first and second storage arrays, send a command to at least one of the first and second storage arrays responsive to the detected notification, and obtain the indication that the copy relationship has been established as at least a portion of information obtained from at least one of the first and second storage arrays responsive to the command. The notification in such an embodiment illustratively comprises a check condition notification and the command illustratively comprises an inquiry command, although other types of notifications and commands can be used.

In step 206, the MPIO driver activates the previously-established migration session in the host device for migration of the source device to the target device with background copying disabled. As a result of such activation, copying of data from the source device to the target device can now proceed within the system as part of the migration process, illustratively under the control of the first storage array, through interaction with the second storage array, and possibly but not necessarily with at least some involvement of the host device in the data copying portion of the migration process. Activating the previously-established migration session with background copying disabled in the present embodiment more particularly ensures that any IO operation sent to the target device instead of to the source device will cause corresponding data to be copied from the source device to the target device.

In step 208, the MPIO driver starts sending IO operations to the target device instead of the source device. As indicated elsewhere herein, the MPIO driver in illustrative embodiments maintains separate device identities for the respective source and target devices in conjunction with the migration session, but presents a corresponding composite device having a single device identity to one or more applications executing on the host device. Such a composite device illustratively comprises a pseudo device of the MPIO driver. This arrangement advantageously allows the MPIO layer to translate commands directed to the composite device in the SCSI protocol to commands in the NVMe protocol, suitable for delivery to the target device, in a manner that masks or otherwise hides the access protocol differences between the source and target devices in conjunction with the migration session. Again, other access protocols can be used in other embodiments.

In step 210, the MPIO driver enables background copying for the activated migration session. Accordingly, in the present embodiment, the migration session is initially enabled without background copying, and the background copying is only enabled later in the migration session, so as to avoid expending excessive host resources on background copying of data from the source device to the target device.

In step 212, the first storage array copies data from the source device to the target device as part of the migration session.

In step 214, the copying of data from the source device to the target device completes and the migration ends. For example, the activated migration session is illustratively terminated responsive to completion of the copying of the data of the source device to the target device. The source device is illustratively deprecated or repurposed responsive to termination of the activated migration session.

Although not explicitly indicated in the figure, the process at this point can return to step 200 to carry out one or more additional migration processes.

The steps of the FIG. 2 process are shown in sequential order for clarity and simplicity of illustration only, and certain steps can at least partially overlap with other steps. Also, one or more of the steps referred to as being performed by a particular system component, such as an MPIO driver, can in other embodiments be performed at least in part by one or more other system components.

The host device in conjunction with completion of the migration process commits to the target device. Once the host device has committed to the target device, it will no longer utilize the source device. Any other host devices utilizing the source device can similarly commit to the target device, as described in more detail elsewhere herein.

After all host devices have committed to the target device, the source device can be removed or otherwise deleted from the system.

As indicated above, different instances of the FIG. 2 process can execute at least in part in parallel with one another for different pairs of source and target devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and automated seamless migration functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated seamless migration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
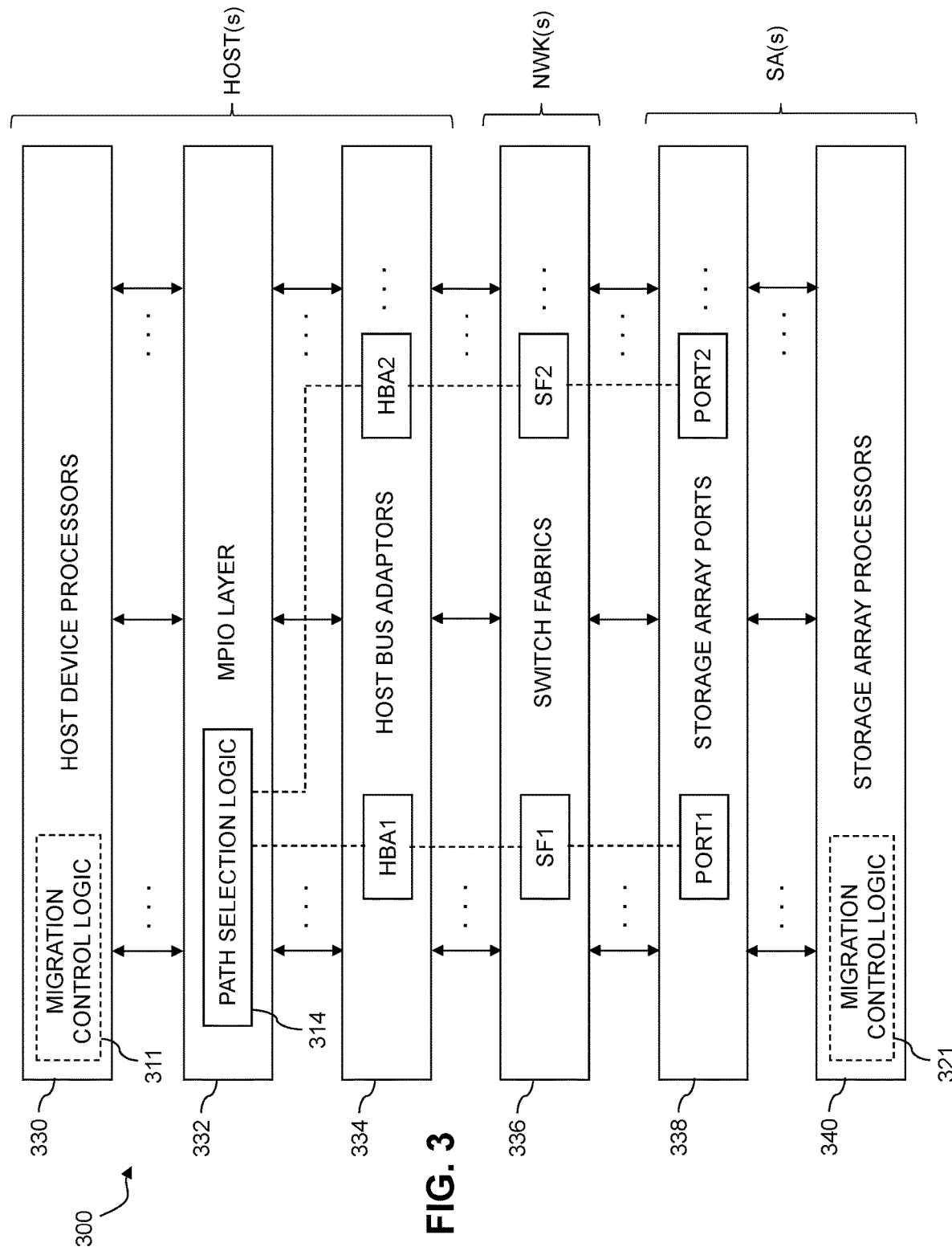
FIG. 3 is a block diagram showing multiple layers of a layered system architecture that includes a multi-path layer with automated seamless migration functionality in an illustrative embodiment.

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated seamless migration of logical storage volumes or other logical storage devices across multiple access protocols. The logical storage devices store data for one or more application processes running in one or more host device processors of the host device processor layer 330. The automated seamless migration functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for automated seamless migration of logical storage devices across multiple access protocols as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side and storage-side migration control logic 311 and 321 in implementing at least portions of the functionality for automated seamless migration of logical storage devices across multiple access protocols as disclosed herein. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of migration control logic 311 or 321 provide functionality for automated seamless migration, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Another example of an automated seamless migration process implemented utilizing an MPIO layer such as MPIO layer 332 of the FIG. 3 embodiment will now be described in more detail. In this example, automated seamless migration of a source logical storage device of a first storage array to a target logical storage device of a second storage array is provided. The source and target logical storage devices are referred to as simply source and target devices in the following description. Similarly, the first and second storage arrays are also referred to as respective source and target arrays.

The process in the present example comprises an algorithm performed by one or more host device and the source and target arrays, with the one or more host devices illustratively utilizing their respective MPIO drivers to perform at least portions of the algorithm. In this example algorithm, the host device advantageously leverages storage array resources for data movement in conjunction with migration of a source device to a target device, rather than utilizing host-based data copying arrangements that can consume excessive amounts of host resources. The process includes the following steps:

1. The source array has a source logical storage device that has a device ID given by ID1. This source device is also referred to as device ID1.

2. The target array includes a target logical storage device that has a device ID given by ID2. This target device is also referred to as device ID2. It is assumed that device ID2 has the same or a larger storage capacity than device ID1. The devices ID1 and ID2 are accessible using respective first and second distinct access protocols, illustratively SCSI-FC for device ID1 and NVMeoFC for device ID2.

3. Assume that device ID1 as a source device on the source array is to be migrated to device ID2 as a target device on the target array using automated seamless migration as disclosed herein.

4. A migration session for migration of device ID to device ID2 is established in the host device but is not activated. For example, this migration session may comprise a PPME migration session of the type described elsewhere herein.

5. The host device continues to send all IOs directed to device ID1 to that device rather than to device ID2.

6. The migration session notifies the storage array to define but not activate a copy relationship for copying data of device ID1 to device ID2. Such notification can utilize a VU command or other type of storage protocol command of the type described elsewhere herein. Other example notification techniques can involve utilization of one or more storage array command line interfaces (CLIs).

7. After the copy relationship is defined, the migration session is activated with background copy disabled. In this background copy disabled mode of the migration session, any IOs directed to device ID2 will automatically cause the corresponding data to be copied from device ID1 to device ID2, but otherwise no data is copied from device ID1 to device ID2. Accordingly, the migration session in this mode uses a "copy on access" approach with no background copy.

8. The host device starts sending IOs to device ID2 instead of to device ID1. For example, as described elsewhere herein, the MPIO driver illustratively maintains separate device identities for device ID1 and device ID2, while presenting a corresponding pseudo device having a single device identity to applications executing on the host device, and translates SCSI-FC commands for device ID into NVMeoFC commands for device ID2. Such translation can involve the use of one or more translation tables for translating SCSI-FC commands into NVMeoFC commands. The MPIO driver of the host device thereby masks or otherwise hides the access protocol differences between the source and target logical storage devices in conjunction with the migration session. Other host devices will also seamlessly transition to use of device ID2 from use of device ID1 as described elsewhere herein.

9. The migration session activates the background copy, and the source array copies data from device IDI to device ID2. The data copying illustratively comprises storage-based data copying performed by the source and target arrays in a manner that advantageously conserves host device resources, but is initiated from a host-based migration session such as a PPME migration session. Other types of migration sessions and data copying arrangements can be used in other embodiments.

10. Once the copy is complete, the host device is working with device ID2 using the NVMeoFC protocol.

11. Device IDI is deprecated or reused for other purposes.

12. Any remote replication and/or snapshot relationships previously involving device ID1 are redefined for device IDS.

The process in the above example provides automated seamless migration of a source device using a first access protocol such as SCSI-FC to a target device using a second access protocol such as NVMeoFC, in a manner that avoids excessive usage of host device resources for data copying between source and target arrays. Moreover, the process can be configured to ensure that multiple host devices using the source device being migrated will each transition to use of the target device at an appropriate time without the need for explicit synchronization of the multiple host devices.

A similar process is assumed to be performed at least in part by any other MPIO drivers on any respective other host devices.

Again, the above process and other processes herein can utilize additional or alternative steps, and certain steps illustrated as being performed serially can instead be performed at least in part in parallel with one another.

Some embodiments include only a single host device, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular automated seamless migration arrangements described above are presented by way of illustrative example only. Numerous alternative arrangements of these and other features can be used in implementing automated seamless migration across multiple access protocols in other embodiments.

The illustrative embodiments disclosed herein can provide a number of significant advantages relative to conventional arrangements. For example, some embodiments configure a host device comprising an MPIO driver to include functionality for automated seamless migration of logical storage volumes or other types of logical storage devices across multiple access protocols.

Such embodiments overcome the drawbacks of conventional approaches that consume significant amounts of computational and network resources of the host device and thereby degrade overall system performance.

For example, some embodiments disclosed herein are configured to facilitate migration of a source logical storage device using a first access protocol such as SCSI-FC to a target logical storage device using a second access protocol such as NVMeoFC, in a particularly efficient manner that intelligently leverages storage system resources rather than over-burdening host device resources. Other embodiments provide automated seamless migration functionality across a wide variety of other access protocols.

Moreover, some embodiments can ensure that multiple host devices using the source device being migrated will each transition to use of the target device at an appropriate time without the need for explicit synchronization of the multiple host devices.

Illustrative embodiments considerably facilitate data migration across storage arrays, leading to improved overall performance.

The disclosed functionality can be implemented using a wide variety of different storage arrays and other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated automated seamless migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device comprising a processor coupled to a memory;
   the host device being configured to communicate over a network with a storage system;
   the host device being further configured:
   to establish a migration session in the host device for migration of a source logical storage device accessible utilizing a first access protocol to a target logical storage device accessible utilizing a second access protocol different than the first access protocol; and to migrate the source logical storage device to the target logical storage device utilizing a multi-path layer of the host device;

wherein the multi-path layer maintains separate device identities for the respective source and target logical storage devices in conjunction with the migration session but presents a corresponding composite device having a single device identity to one or more applications executing on the host device;

wherein the multi-path layer translates one or more commands directed to the composite device in the first access protocol to one or more commands in the second access protocol by modifying at least a subset of the commands in the first access protocol to produce corresponding commands in the second access protocol; and wherein the host device in conjunction with migrating the source logical storage device to the target logical storage device is further configured:

to direct the storage system to establish a copy relationship between the source logical storage device and the target logical storage device;

to obtain an indication from the storage system that the copy relationship has been established;

responsive to the obtained indication, to activate the previously-established migration session with background copying disabled;

to start sending input-output operations to the target logical storage device instead of to the source logical storage device; and to enable background copying for the activated migration session such that data of the source logical storage device is copied to the target logical storage device by the storage system.

2. The apparatus of claim 1 wherein the first access protocol comprises a Small Computer System Interface (SCSI) access protocol and the second access protocol comprises a Non-Volatile Memory Express (NVMe) access protocol.

3. The apparatus of claim 2 wherein the SCSI access protocol comprises a SCSI over Fibre Channel (SCSI-FC) access protocol and the NVMe access protocol comprises an NVMe over Fibre Channel (NVMeoFC) access protocol.

4. The apparatus of claim 1 wherein the source logical storage device and the target logical storage device are both located on the same storage system.

5. The apparatus of claim 1 wherein the storage system comprises a first storage system that includes the source logical storage device and further wherein the target logical storage device is located on a second storage system, the host device being configured to communicate over the network with the first and second storage systems.

6. The apparatus of claim 1 wherein the multi-path layer comprises at least one multi-path input-output driver configured to control delivery of input-output operations from the host device to the storage system over selected paths through the network, the multi-path input-output driver being further configured to maintain the separate device identities for the respective source and target logical storage device, to present the corresponding composite device having the single device identity, and to translate the one or more commands directed to the composite device.

7. The apparatus of claim 1 wherein directing the storage system to establish a copy relationship between the source logical storage device and the target logical storage device comprises directing the storage system to establish a copy relationship between the source logical storage device and the target logical storage device that when activated causes copying of data from the source logical storage device to the target logical storage device.

8. The apparatus of claim 7 wherein the copy relationship is established but is not activated to perform the copying of data from the source logical storage device to the target logical storage device.

9. The apparatus of claim 1 wherein obtaining an indication from the storage system that the copy relationship has been established comprises:

sending a command to the storage system; and obtaining the indication responsive to the command.

10. The apparatus of claim 1 wherein establishing the migration session in the host device for migration of the source logical storage device to the target logical storage device comprises configuring but not activating the migration session in the host device.

11. The apparatus of claim 1 wherein activating the previously-established migration session with background copying disabled is configured to ensure that any input-output operation sent to the target logical storage device instead of to the source logical storage device will cause corresponding data to be copied from the source logical storage device to the target logical storage device.

12. The apparatus of claim 1 wherein the host device is further configured to terminate the activated migration session responsive to completion of the copying of the data of the source logical storage device to the target logical storage device by the storage system, and wherein the source logical storage device is deprecated or repurposed responsive to termination of the activated migration session.

13. The apparatus of claim 1 further comprising one or more additional host devices each configured to communicate over the network with the storage system, and wherein each of the host devices separately moves from utilization of the source logical storage device to utilization of the target logical storage device.

14. A method performed by a host device configured to communicate over a network with a storage system, comprising:

establishing a migration session in the host device for migration of a source logical storage device accessible utilizing a first access protocol to a target logical storage device accessible utilizing a second access protocol different than the first access protocol; and migrating the source logical storage device to the target logical storage device utilizing a multi-path layer of the host device;

wherein the multi-path layer maintains separate device identities for the respective source and target logical storage devices in conjunction with the migration session but presents a corresponding composite device having a single device identity to one or more applications executing on the host device;

wherein the multi-path layer translates one or more commands directed to the composite device in the first access protocol to one or more commands in the second access protocol by modifying at least a subset of the commands in the first access protocol to produce corresponding commands in the second access protocol;

the method further comprising:

directing the storage system to establish a copy relationship between the source logical storage device and the target logical storage device;

obtaining an indication from the storage system that the copy relationship has been established;

responsive to the obtained indication, activating the previously-established migration session with background copying disabled;

starting to send input-output operations to the target logical storage device instead of to the source logical storage device; and enabling background copying for the activated migration session such that data of the source logical storage device is copied to the target logical storage device by the storage system; and wherein the host device comprises a processor coupled to a memory.

15. The method of claim 14 wherein activating the previously-established migration session with background copying disabled is configured to ensure that any input-output operation sent to the target logical storage device instead of to the source logical storage device will cause corresponding data to be copied from the source logical storage device to the target logical storage device.

16. The method of claim 14 wherein the multi-path layer comprises at least one multi-path input-output driver configured to control delivery of input-output operations from the host device to the storage system over selected paths through the network, the multi-path input-output driver being further configured to maintain the separate device identities for the respective source and target logical storage device, to present the corresponding composite device having the single device identity, and to translate the one or more commands directed to the composite device.

17. A computer program product comprising a non-transitory processor-readable storage medium having stored therein program code of one or more software programs, wherein the program code, when executed by a host device comprising a processor coupled to a memory and configured to communicate over a network with a storage system, causes the host device:

to establish a migration session in the host device for migration of a source logical storage device accessible utilizing a first access protocol to a target logical storage device accessible utilizing a second access protocol different than the first access protocol; and to migrate the source logical storage device to the target logical storage device utilizing a multi-path layer of the host device;

wherein the multi-path layer maintains separate device identities for the respective source and target logical storage devices in conjunction with the migration session but presents a corresponding composite device having a single device identity to one or more applications executing on the host device;

wherein the multi-path layer translates one or more commands directed to the composite device in the first access protocol to one or more commands in the second access protocol by modifying at least a subset of the commands in the first access protocol to produce corresponding commands in the second access protocol; and wherein the program code when executed by the host device further causes the host device:

to direct the storage system to establish a copy relationship between the source logical storage device and the target logical storage device;

to obtain an indication from the storage system that the copy relationship has been established;

responsive to the obtained indication, to activate the previously-established migration session with background copying disabled;

to start sending input-output operations to the target logical storage device instead of to the source logical storage device; and to enable background copying for the activated migration session such that data of the source logical storage device is copied to the target logical storage device by the storage system.

18. The computer program product of claim 17 wherein activating the previously-established migration session with background copying disabled is configured to ensure that any input-output operation sent to the target logical storage device instead of to the source logical storage device will cause corresponding data to be copied from the source logical storage device to the target logical storage device.

19. The computer program product of claim 17 wherein establishing the migration session in the host device for migration of the source logical storage device to the target logical storage device comprises configuring but not activating the migration session in the host device.

20. The computer program product of claim 17 wherein the multi-path layer comprises at least one multi-path input-output driver configured to control delivery of input-output operations from the host device to the storage system over selected paths through the network, the multi-path input-output driver being further configured to maintain the separate device identities for the respective source and target logical storage device, to present the corresponding composite device having the single device identity, and to translate the one or more commands directed to the composite device.

* * * * *